United States Patent [19]

Velasco et al.

[11] 4,203,649
[45] May 20, 1980

[54] PROCESS FOR MANUFACTURING AN INTEGRATED OPTICAL STRUCTURE AND AN OPTO-ELECTRONIC DEVICE USING SAID STRUCTURE

[75] Inventors: Gonzalo Velasco; Michel Papuchon, both of Paris, France

[73] Assignee: Thomson-CSF, Paris, France

[21] Appl. No.: 930,410

[22] Filed: Aug. 2, 1978

[30] Foreign Application Priority Data

Aug. 5, 1977 [FR] France ............... 77 24219

[51] Int. Cl.$^2$ ............... G02B 5/14
[52] U.S. Cl. ............... 350/96.14; 29/576 T; 148/187; 350/96.11; 350/356; 350/320; 427/164
[58] Field of Search ............... 350/96.11, 96.12, 96.13, 350/96.14, 355, 356, 320; 148/6.3, 187; 427/38, 55, 108, 162, 164; 29/576 R, 576 W, 576 T, 578, 584

[56] References Cited

U.S. PATENT DOCUMENTS

| | | | |
|---|---|---|---|
| 3,874,782 | 4/1975 | Schmidt | 350/96.13 |
| 3,923,374 | 12/1975 | Martin | 350/96.14 |
| 3,964,819 | 6/1976 | Auracher | 350/96.14 |
| 4,005,927 | 2/1977 | Caton | 350/96.14 |
| 4,012,113 | 3/1977 | Kogelnik et al. | 350/96.13 |
| 4,035,058 | 7/1977 | Papuchon | 350/96.14 |
| 4,087,315 | 5/1978 | Auracher et al. | 350/96.12 X |
| 4,127,320 | 11/1978 | Li | 350/96.13 |
| 4,136,439 | 1/1979 | Auracher et al. | 350/96.12 X |
| 4,146,297 | 3/1979 | Alferness et al. | 350/96.14 |

FOREIGN PATENT DOCUMENTS

2309890 11/1976 France ............... 350/96.14

OTHER PUBLICATIONS

Schmidt, "Metal-Diffused Optical Waveguides in LiNbO$_3$," *Applied Physics Lttrs.*, vol. 25, No. 8, Oct. 1974, pp. 458-460.
Papuchon et al., "Coupleur Directionnel Optique Commandé Électriquement", *C. R. Acad. Sc. Paris,* vol. 281, Jul. 1975, pp. 85-88.

*Primary Examiner*—John K. Corbin
*Assistant Examiner*—John D. Lee
*Attorney, Agent, or Firm*—Oblon, Fisher, Spivak, McClelland & Maier

[57] ABSTRACT

A process designed for manufacturing an opto-electronic device comprising at least one light-guide integrated in a substrate with a control electrode constituted by a metallic band covering the light-guide and deposited onto the substrate, and an earth-plane integrated in the bottom of the substrate. The process comprises a preliminary step wherein the light-guide is created by doping the substrate for example in a channel adjacent to the upper side of the substrate. In the first step the material of the substrate (e.g. monocrystalline lithium niobate) is chemically reduced by hydrogen for rendering the whole substrate electrically conductive (and consequently opaque). After a second step of partial protective masking, a third step takes place wherein the upper part of the substrate is re-oxidized for restoring a transparent layer comprising the light-guide - the latter characterized by a higher refractive index - and an insulating medium in the upper part of the substrate. In a last step a metallic band is deposited onto the light guide forming with the conductive bottom substrate two electrodes of the opto-electronic device.

6 Claims, 5 Drawing Figures

PROCESS FOR MANUFACTURING AN INTEGRATED OPTICAL STRUCTURE AND AN OPTO-ELECTRONIC DEVICE USING SAID STRUCTURE

The invention concerns a process for manufacturing an integrated optical structure whereof the operation requires the application of an electric field, and an integrated opto-electronic device using said structure. It is a matter more particularly of electro-optical structures comprising a base material ($Li\ Nb\ O_3$, $Li\ Ta\ O_3$ for example) exhibiting the following properties:

good light-transmission;

possibility of modifying the refractive index in a given region of the material by appropriate and localised doping of this material;

sensitive electro-optical, and perhaps acoustooptical, effects;

transformation into a more or less transparent and more or less electrically conductive substance under the effect of a physico-chemical treatment, such as reduction of the material (total or partial elimination of the oxygen participating in the composition of the material).

In integrated optical structures, the base material constitutes a substrate in which one or more light-guides are embodied by localised doping. Such a substrate has a thickness of the order of 2 mm or more in order to preserve the structure from risks of breakage in the course of the various steps of manufacturing the electro-optical device. In devices, such as deflectors, modulators and electrooptical commutators, that one of the electrodes deposited on the same face of the substrate which is adjacent to the light-guides is used in oder to set up an electric field in the light-guide or guides. Now this co-planar arrangement is frequently less favourable to good operation of the device than arranging the electrodes on opposite faces of the substrate. One solution might reside in depositing an earth plane on the face opposite to that which is adjacent to the light-guides, but this solution does not give good results because of the small depth of these guides (a few tens of micrometers at most) compared to the relatively great thickness of the substrate (2 mm).

The invention enables this last difficulty to be solved, and furthermore exhibits the following advantages:

possible reduction in the total number of electrodes;

possible reinforcememnt of the electric field effectively in use;

embodiment of an earth plane, which may be important in order to improve the performance of the electro-optical device at very high frequency;

finally, manufacture of the electrodes at low temperature, which enables the light-guides to be protected from any possible damage, due to heat.

According to the present invention, there is provided a process for manufacturing an integrated optical structure whereof the operation requires the application of an electric field, comprising at least the following steps:

complete reduction of a basic material saturated with oxygen constituting the substrate of the structure;

deposition of a protective mask covering the major part of the surface of the substrate;

oxidisation of the material by the penetration of oxygen through that part of the surface not protected by said mask.

The invention will be better understood, and other features will appear, from the following description with reference to the drawings which accompany it, wherein.

Figure 1:
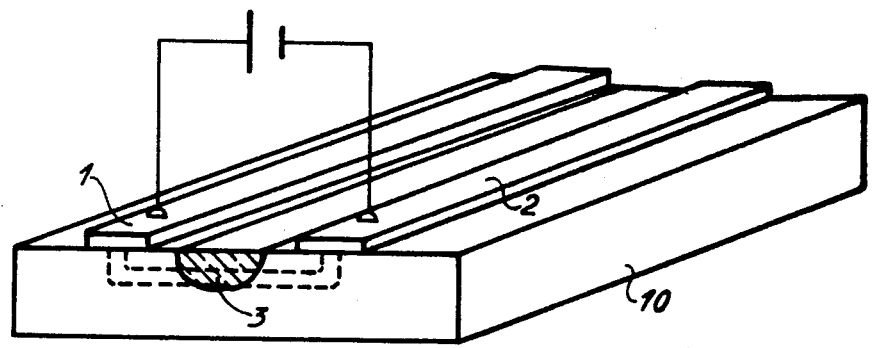
FIG. 1 and FIG. 3 illustrate in diagrammatic perspective two examples of structures of conventional integrated opto-electronic devices.
Figure 3:
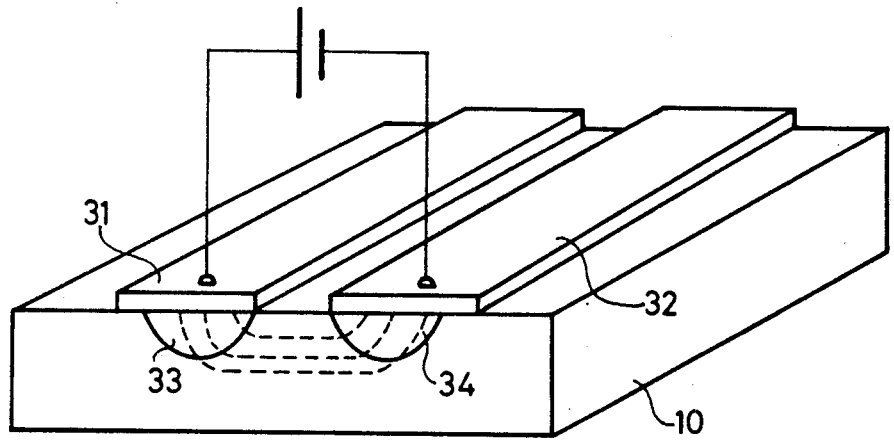

In a phase-modulator (FIG. 1) and in a commutator having two light-guides (FIG. 3), a conventional embodiment comprises two electrodes (1 and 2, FIG. 1; 31 and 32, FIG. 3) arranged in parallel fashion on the large face of the substrate 10 nearer to the light-guide(s) (3, FIG. 1; 33 and 34, FIG. 3).

In a device according to the invention of a similar phase-modulator, a lithium niobate substrate 10 has been reduced by a treatment which will be specified hereinafter over the major part of its thickness. This has produced an opaque electrically conductive layer, constituting to some extent a new substrate which at the same time acts as an earth plane. The rest of the substrate forms a layer 12 of stoichiometric lithium niobate ($Li\ Nb\ O_3$) in which titanium has been diffused in order to form a light-guide 3 whereof the refractive index is greater than that of the pure niobate. An electrode 20 which fully covers the guide 3 has been deposited on the large face 120 of the substrate. A potential difference emanating from a source 23 is applied by the connections 21 and 22 to studs 210 and 220 soldered to the electrode 20 and to the part 11 of the substrate 10 respectively.

Calculation shows and experience confirms that the lines of force of the electric field are more favourably arranged in the structure according to the invention.

Figure 4:
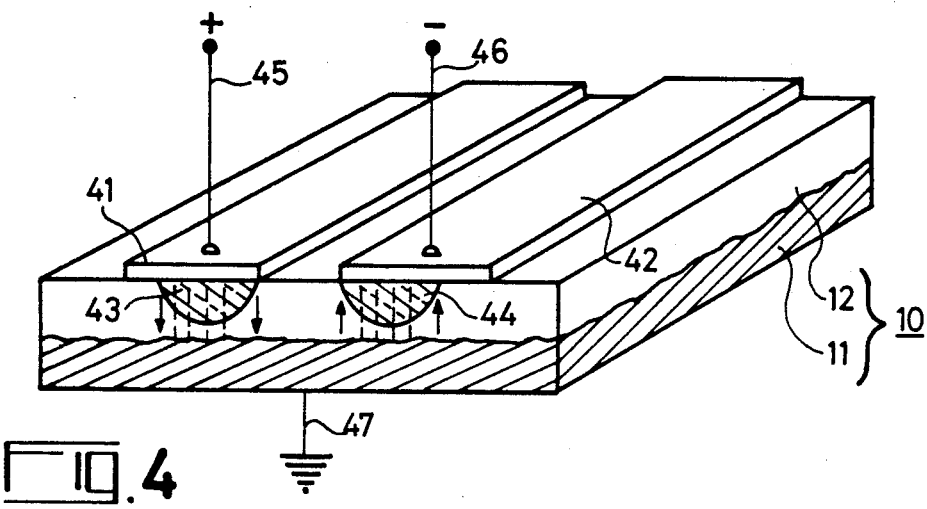

In another device according to the invention of a commutator having two light-guides 43 and 44 (FIG. 4), two electrodes 41 and 42 are deposited on a substrate 10 similar to the substrate of FIG. 3. Two connections 45 and 46 enable potentials which are alternately positive and negative with respect to the potential of an earth point 47 to be applied in order to perform the optical commutation.

Figure 2:
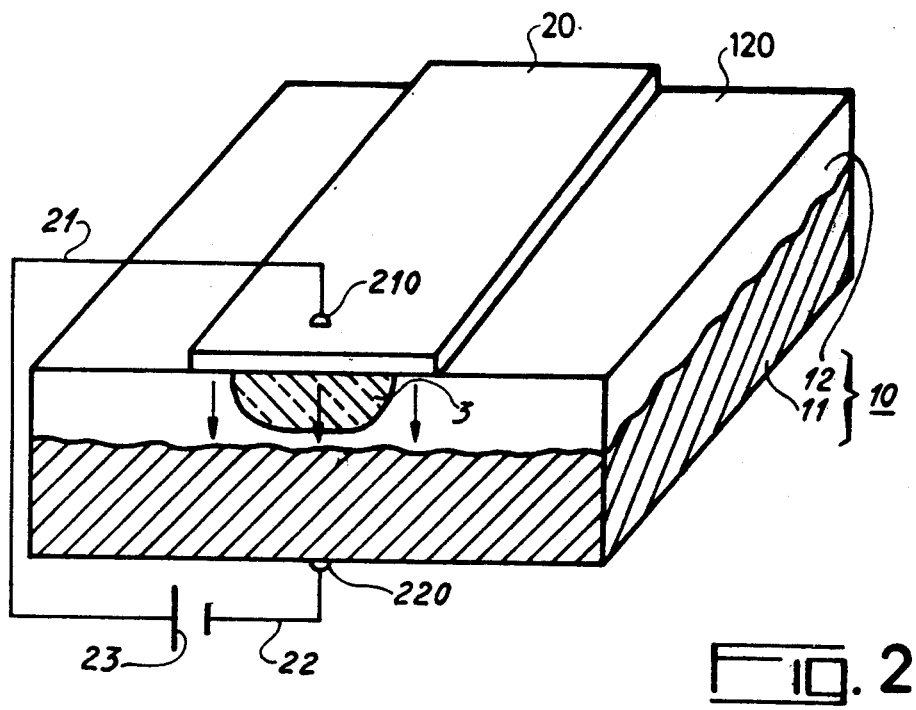
FIG. 2 and FIG. 4 illustrate in diagrammatic perspective two examples of structures of opto-electronic devices which are similar to the foregoing, but which are manufactured by a process according to the invention.

The performance of such a commutator is superior to that of the conventional commutator illustrated in FIG. 2, which results more particularly from the new configuration of the lines of force of the electric field.

A description is given hereinafter of an example of a process according to the invention.

Figure 5:
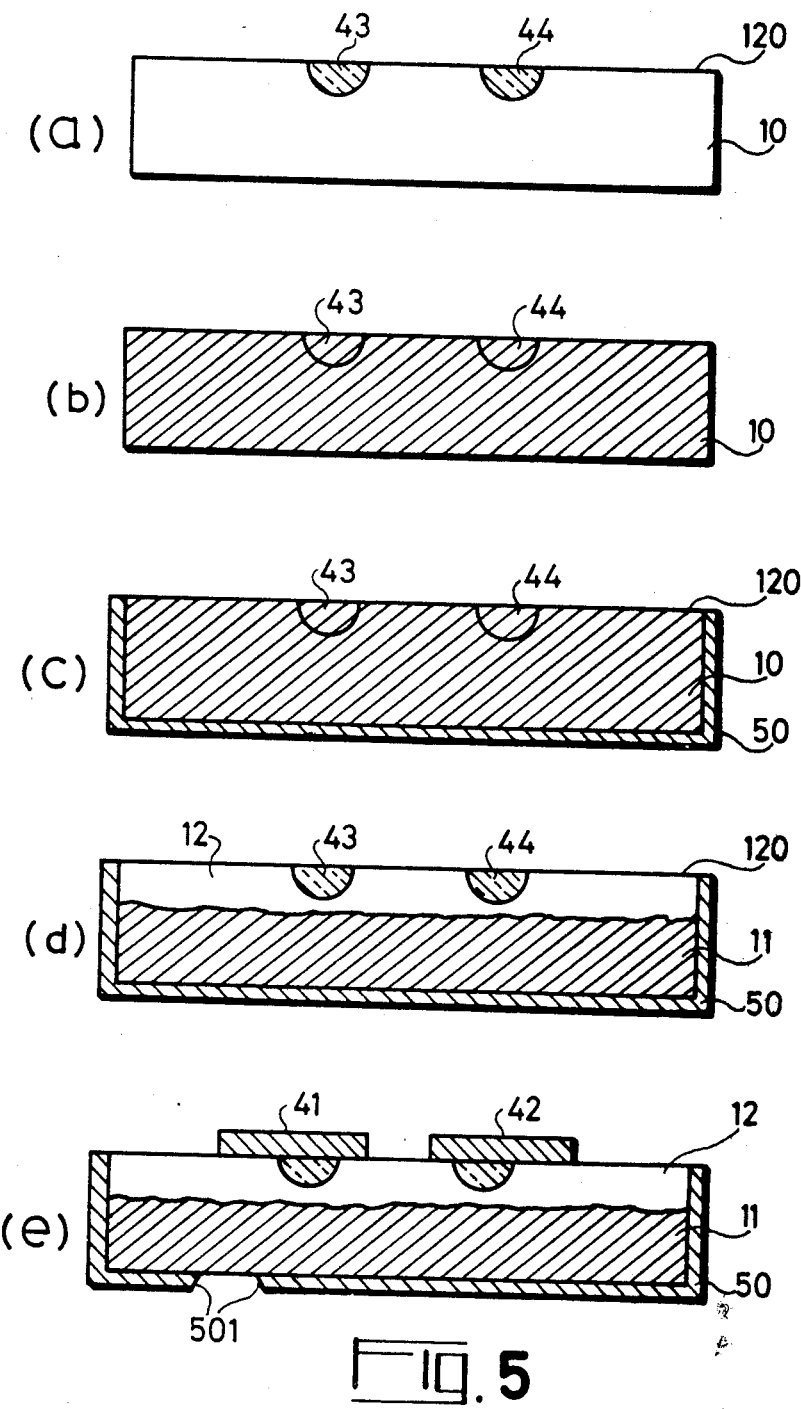
FIG. 5 illustrates different steps of a process according to the invention.

FIG. 5 illustrates the results obtained respectively:

at (a), at the end of a preliminary step of forming light-guides;

at (b) and at (c), at the end of a first and a second step respectively;

at (d) at the end of a third step;

at (e), at the end of an additional step, before soldering the electrical connections.

In the course of the preliminary step, a start is made from a slice 10 of monocrystalline lithium niobate, and titanium is diffused into two regions 43 and 44 for the purpose of constituting two parallel light-guides adjacent to the upper face 120 of the slice 10. Such diffusion is conventional in the technology of integrated optics, and makes use of the techniques of microlithography.

The guides thus obtained have a semicircular cross-section of a diameter which may be from a few microns to several tens of microns.

In the course of a first step of the process, the constituent material of the slice 10 is reduced at a relatively low temperature, for example 400° C. For this purpose, the slice is introduced into an evacuated enclosure in which means for pumping gases produce a pressure of 0.1 Torr in spite of a permanent introduction of hydrogen. A hydrogen plasma is created in the enclosure by a high-frequency electromagnetic field, the material being heated by infrared radiation through the transparent walls of the enclosure.

In the course of a second step of the process, a layer 50 is deposited, being a few hundred angstroms thick, and being illustrated at (c), in FIG. 5. This layer has the purpose of preventing the material from being oxidised via the lower face and the lateral faces. It may be formed for example by depositing a metal such as aluminum by evaporation. A layer of silicon nitride $Si_3N_4$ may also be deposited by other conventional methods.

In the course of a third step of the process, the material is oxidised by attacking the slice via the upper face. Oxidisation can take place under conditions similar to those of the second step by replacing the hydrogen with oxygen. The time of oxidisation is regulated by trial and error in order not to exceed the desirable thickness of regenerated material. The result illustrated at (d) in FIG. 5 is obtained, that is to say a layer 12 of regenerated material covering the rest of the slice consisting of a layer 11 of electrically conductive material. This layer occupies more than 9/10 of the volume of the slice. It is intended to serve as an earth plane in the final optoelectronic component.

In the course of an additional step, electrodes 41 and 42 are deposited on the upper face of the slice covering the light-guides 43 and 44. If the layer 50 is insulating, a window 501 is opened on one of the faces of the slice by selective chemical attack, in order to enable an electrical connection to be soldered.

What we claim is:

1. Process for manufacturing an integrated optical structure whereof the operation requires the application of an electric field, comprising the following steps:
    (a) formation of at least one light-guide by localized doping of a region of the substrate constituted by a basic material saturated with oxygen;
    (b) reduction of the material of said substrate by thermal treatment in a hydrogen plasma;
    (c) deposition of a protective layer impermeable to oxygen over all the faces minus one of said substrate;
    (d) oxidization of said substrate by the penetration of oxygen through the unprotected face of said substrate;
    (e) deposition of electrodes on said unprotected face, the rest of the material not oxidized in the preceding step being intended to serve as the earth electrode of the structure.

2. Process according to claim 1, wherein in step (c) said protective layer consists of aluminium.

3. Process according to claim 1, wherein in step (c) said protective layer consists of silicon nitride.

4. Opto-electronic device comprising a structure manufactured by a process according to claim 1 comprising a light-guide integrated into said substrate, an electrode deposited on said guide, and an earth plane consisting of a reduced part of the substrate.

5. Opto-electronic device comprising a structure manufactured by a process according to claim 1 comprising two light-guides integrated into said substrate, two electrodes deposited respectively on each guide, and an earth plane consisting of a reduced part of the substrate.

6. Process according to claim 1, wherein said basic material comprises lithium niobate or tantalate.

* * * * *